US011507860B1

(12) United States Patent
Hodgman et al.

(10) Patent No.: US 11,507,860 B1
(45) Date of Patent: Nov. 22, 2022

(54) MACHINE LEARNED INFERENCE OF PROTOCOLS FROM BANNER DATA

(71) Applicant: Rapid7, Inc., Boston, MA (US)

(72) Inventors: Roy D. Hodgman, Cambridge, MA (US); Derek Abdine, Rancho Palos Verdes, CA (US); Thomas E. Sellers, Georgetown, TX (US); Prashant Subbarao, Cambridge, MA (US)

(73) Assignee: Rapid7, Inc., Boston, MA (US)

( * ) Notice: Subject to any disclaimer, the term of this patent is extended or adjusted under 35 U.S.C. 154(b) by 473 days.

(21) Appl. No.: 16/799,764

(22) Filed: Feb. 24, 2020

(51) Int. Cl.
*H04L 69/164* (2022.01)
*H04L 9/40* (2022.01)
*G06N 5/04* (2006.01)
*G06N 20/00* (2019.01)
*H04L 69/00* (2022.01)
*H04L 67/60* (2022.01)

(52) U.S. Cl.
CPC ............... *G06N 5/04* (2013.01); *G06N 20/00* (2019.01); *H04L 63/1425* (2013.01); *H04L 67/60* (2022.05); *H04L 69/03* (2013.01); *H04L 69/164* (2013.01)

(58) Field of Classification Search
None
See application file for complete search history.

(56) References Cited

U.S. PATENT DOCUMENTS

| 7,519,954 | B1 | 4/2009 | Beddoe et al. | |
| 7,716,742 | B1 | 5/2010 | Roesch et al. | |
| 10,397,256 | B2 | 8/2019 | Kashi et al. | |
| 2004/0193918 | A1 | 9/2004 | Green et al. | |
| 2019/0191017 | A1* | 6/2019 | Aggarwal | H04W 36/03 |
| 2019/0250898 | A1* | 8/2019 | Yang | H04L 41/082 |
| 2020/0013124 | A1 | 1/2020 | Obee et al. | |
| 2020/0162500 | A1* | 5/2020 | Ciocarlie | H04L 41/145 |

FOREIGN PATENT DOCUMENTS

| EP | 3544236 | 9/2019 |
| FR | 2910204 | 6/2008 |

* cited by examiner

*Primary Examiner* — Angela Nguyen
(74) *Attorney, Agent, or Firm* — Ashwin Anand; Lei Sun

(57) ABSTRACT

Systems and methods are disclosed to infer, using a machine learned model, a service protocol of a server based on the banner data produced by the server. In embodiments, the machine learned model is implemented by a network scanner configured to receive banner data from open ports on servers. A received banner is parsed into a set of features, such as the counts or presence of particular characters or strings in the banner. In embodiments, certain types of banner content such as network addresses, hostnames, dates, and times, are replaced with special characters. The machine learned model is applied to the features to infer a most likely protocol of the server port that produced the banner. Advantageously, the model can be trained to perform the inference task with high accuracy and without using human-specified rules, which can be brittle for unconventional banner data and carry undesired biases.

20 Claims, 10 Drawing Sheets

MACHINE SCAN RESULTS 600

MACHINE INFORMATION: 610

ADDRESS: 88.200.155.166    LAST SCAN: Dec 10, 2019 2:50:00 PM (10 days ago)

HOST TYPE: Unknown    NEXT SCAN: Not set

OS: XYZ LINUX v 7.3    RISK SCORE: 1280

DETECTED OPEN PORTS: 620

| PORT 622 | INFERRED PROTOCOL 624 | ON STANDARD PORT 626 | CHANGED SINCE LAST SCAN 628 | RUN PROTOCOL TEST 630 | PORT TEST RESULTS 632 |
|---|---|---|---|---|---|
| 21 | FTP | | | Run | ... |
| 22 | SSH | | | Run | ... |
| 23 | Telnet | | | | ... |
| 122 | HTTPS | No | Yes | Run | ... |
| 125 | Unknown | No | Yes | | ... |
| 300 | Remote shell | | | Run | ... |

MACHINE LEARNED INFERENCE OF PROTOCOLS FROM BANNER DATA

BACKGROUND

In the field of network monitoring and security assessment, it is often useful to systematically scan machines in a computer network to determine open ports on the machines and the service protocols running on the open ports. Traditional network scanning systems typically attempt to deduce the protocol of a port based on the port number (e.g., the SSH protocol typically appears on port 22). However, such deduction methods will break down when a protocol is provided from a non-standard port.

When a network interaction is initiated between a client and a server, the server may provide a banner during the first exchange of information between the two systems. These banners are akin to the business cards of the servers. The banner may include a response code, a welcome or warning message, and other information about the server and the service provided by the server, such as the server's IP address, other publicly available identifying information about the server, and the name and version number of the server software. Although such banner data may include information that is suggestive of the service protocol, programmatic identification of protocols from this banner data presents a number of challenges. For one thing, the banner data can be presented in a variety of different formats and include a variety of different types of information, and programmed rules to semantically analyze banner data do not cope well with unforeseen banners. Moreover, human-specified rules for banner interpretation inevitably include human-injected biases, which may prove to be incorrect in practice. Better techniques are needed to programmatically identify service protocols during network scanning.

SUMMARY OF EMBODIMENTS

The systems and methods described herein may be employed in various combinations and in embodiments to implement a protocol inference system that that uses a machine learned model to infer service protocols of servers based on banner data produced by the servers. In embodiments, the machine learned model is implemented by a network scanner configured to scan servers for open ports and obtain banner data from the open ports. An obtained banner is parsed into a set of features, such as counts or presence of particular characters or strings in the banner. In embodiments, certain types of banner content such as network addresses, hostnames, dates, and times, are replaced with special characters. The features are provided as a feature vector to the machine learned model, which is trained to infer the most likely protocol of the server port that produced the banner. Advantageously, the model can be trained to perform the inference task with high accuracy and without using human-specified rules, which can be brittle for unconventional banner data and carry undesired human biases.

BRIEF DESCRIPTION OF THE DRAWINGS

FIG. 6 illustrates an example graphical user interface (GUI) that provides inference results of ML model trained to infer service protocols from banner data, according to some embodiments.

Figure 1:
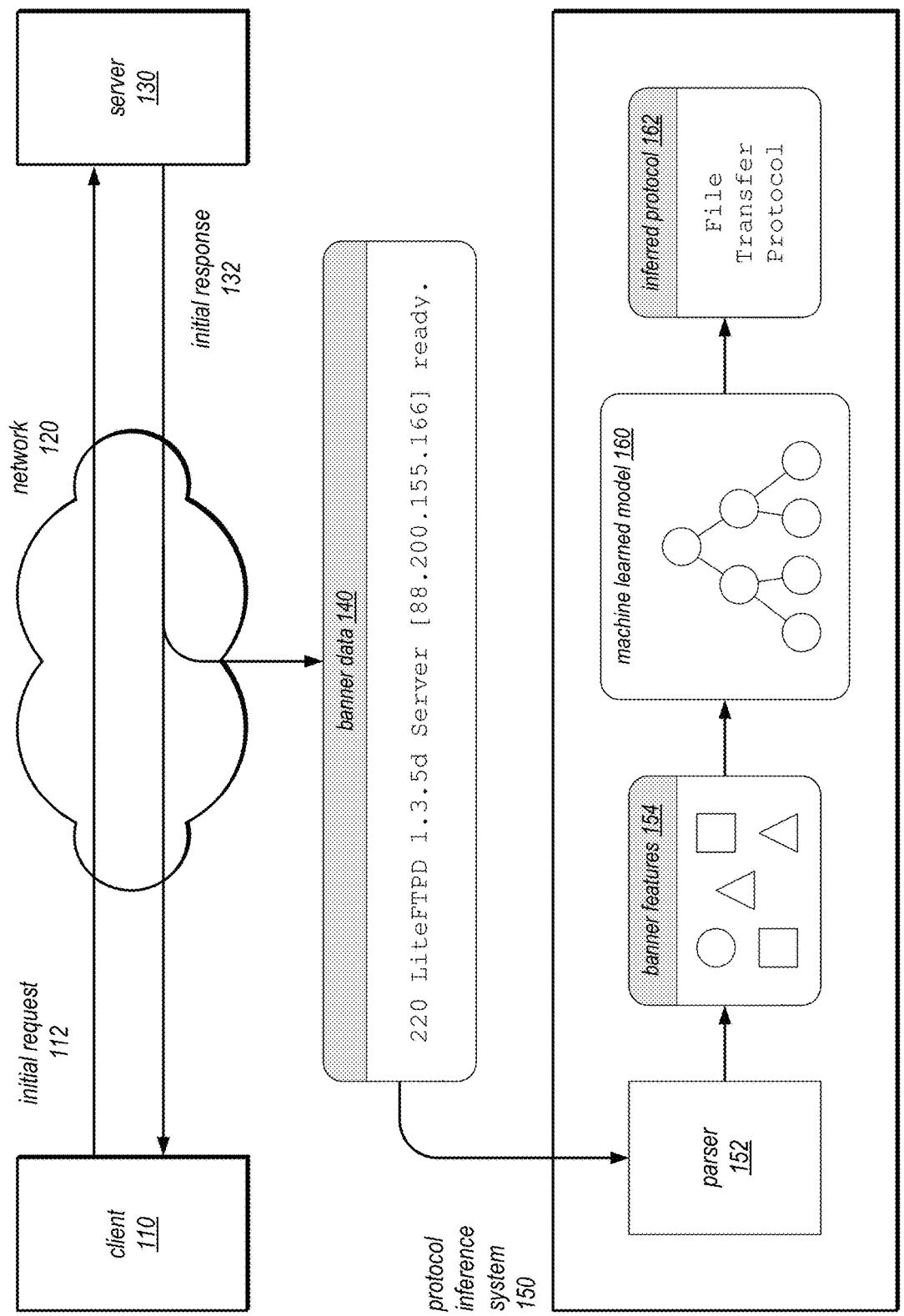
FIG. 1 is a block diagram illustrating an example protocol inference system that uses a machine learned (ML) model to infer service protocols from banner data, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In the field of network monitoring and security assessment, it is often useful to scan machines in a computer network to determine open ports on the machines and service protocols running on the open ports. Traditional network scanning systems typically attempt to deduce the protocol of a port based on the port number. However, such deduction methods will break down when a protocol is provided from a non-standard port.

When a network interaction is initiated between a client and a server, the server may provide a banner during the first exchange of information between the two systems. For example, when a network connection is first established between a File Transfer Protocol (FTP) server and a client, the FTP server may send its banner to the client. The banner data does not generally conform to any particular syntax. Depending on the protocol and the server software, the banner may include a variety of information such as a response code, a welcome or warning message, the server's IP address, other identifying information about the server, the name and version number of the server software, the current time, the status of the server, among other types of information. These banners are akin to the business cards of the servers.

Although such banner data may include information that is suggestive of the service protocol, programmatic identification of protocols from this banner data presents a number of challenges. For one thing, the banner data can be presented in many different formats and include many different types of information, and programmed rules to semantically analyze banner data do not cope well with unconventional banners. Moreover, human-specified rules for banner interpretation inevitably carry with them human-injected biases, which may prove to be incorrect in practice.

Accordingly, embodiments of a protocol inference system are disclosed herein that use a machine learned (ML) model to infer the service protocol of a server based on banner data produced by the server. In some embodiments, the ML model may be implemented within a network scanning system configured to configured to scan servers for open ports, and the ML model may be trained to determine protocols on the open ports based on their banner data.

In some embodiments, the protocol inference system may extract features from the banner data and provide these features as an input feature vector to the ML model. Depending on the embodiment, the ML model may be implemented as a tree-based model (e.g. a random forest model), a neural network model (e.g. a recursive neural network or convolutional neural network), or some other type of ML model. The ML model is trained using one or more machine learning techniques to infer a type of service protocol from the feature vector. The ML model may be trained perform a classification task to select a most likely protocol from a group of protocol classes. In some embodiments, the model's output may include a vector of some or all of the protocol classes, along with a confidence value (e.g. a probability value expressed as a percentage) for each protocol class. The model output may then be analyzed by a configurable interpretation component to select the inferred protocol (e.g., the protocol having the largest confidence value and exceeding a specified confidence threshold).

In some embodiments, the banner data may be in encoded as text, and the input feature set extracted from the banner data may include respective counts of individual characters or tokens in the banner data. Depending on the embodiment, the banner features used for protocol inference may include some or all of the following: the counts or presence (or absence) of particular types of characters or tokens (e.g. alphabetical characters, numeric characters, capitalized characters, lowercase characters, ASCII characters, non-ASCII characters, etc.); the counts or presence/absence of particular sequence of characters or tokens (e.g. the name of a particular protocol such as "smtp"); the total count of characters or tokens (as determined by specified delimiters) in the banner data; as well as other features. In some embodiments, the feature set may be selected to include largely low-level features of the banner data that are agnostic as to the banner's semantic contents. In this manner, the resulting model will not be unduly prejudiced by human biases for particular types of banner content. The use of lower level features also reduces the chances of overfitting of the model to particular types of training data.

In some embodiments, the banner data may be preprocessed to remove or replace certain types of content in the banner data with special characters or tokens as placeholders. The replacement characters or tokens are treated the same as the other characters or tokens during the feature extraction process. Types of content that are removed or replaced may include high-variance or low-value content that commonly appear in banner data, such as network addresses (e.g. IP addresses), hostnames, dates, times, time zones, the word "ready," etc. The preprocessing step thus removes "noisy" content that skew results of the inference process and improves the overall accuracy of the ML model. Depending on the embodiment, the preprocessing step may be performed by the ML model itself or by a parsing component separate from the model.

The inferred service protocol may be used in a variety of ways by downstream components. In some embodiments, the inferred protocol(s) may be via a user interface (e.g., a GUI of a network scanner), and may be used to perform ML-assisted tagging of open ports. In some embodiments, the inferred protocol may be validated using protocol fingerprinting techniques and/or human inspection of the banner data. However, ML-based protocol inferences can be generated programmatically as a first step, based on the initial banner data alone.

In some embodiments, protocol tag metadata may be monitored by the network scanning system to detect protocol changes over successive scans. In some embodiments, the network scanning system may be configured to scan public addresses on the Internet and track protocol distribution data for open ports on the Internet. In some embodiments, the network scanning system may generate a notification or an alert when a protocol is detected on a port with a non-standard port number for that protocol.

In some embodiments, the inferred protocol may be used by a network scanning system to automate certain protocol-specific scanning activities. For example, the network scanning system may be configured to automatically retrieve a file list from a server when it detects that the server is an FTP server. As another example, the network scanning system may be configured to automatically launch a set of protocol-specific penetration tests against a port once the port's protocol is identified.

In some embodiments, the accuracy of ML model may be improved by performing ongoing training of the model using additional banner data received over time. For example, as part of an ongoing periodic scan of the Internet, the network scanning system may collect banner data that caused the model to generate incorrect or low-confidence results. Such banner data may be labeled and added to a training data repository for further training of the model. In this manner, the model can be continually improved with additional training data and kept up-to-date with new types of banners observed on the Internet. In some embodiments, such ongoing training may be used to develop custom models for particular computer systems or networks.

As will be appreciated by those skilled in the art, the disclosed features of the ML-based protocol inference system provide numerous technical improvements to enhance the functioning of existing protocol discovery systems in the state of the art. These and other features and benefits of the ML-based protocol inference system are described in further detail below, in connection with the figures.

FIG. 1 is a block diagram illustrating an example protocol inference system that uses a machine learned model to infer service protocols from banner data, according to some embodiments.

As shown, in this example, the depicted protocol inference system 150 is implemented as a passive observer of network traffic between a client 110 and a server 130. In other embodiments, the protocol inference system 150 may be an active participant in the network traffic. For example, embodiments of the protocol inference system 150 may be implemented as the client 110 or with the capability to cause the client 110 to communicate with the server 130. Depending on the embodiment, the protocol inference system 150 may be implemented locally in the same network (e.g. a private network) as the server 130, or remotely in a different network (e.g. in the cloud).

In this example, the client 110 and server 130 are two distinct computer systems that can communicate over a computer network 120. As shown, the client 110 and server 130 engages in an initial interaction, where the client sends an initial request 112 to the server, and the server responds with an initial response 132. As shown, the initial response 132 includes banner data 140, which is in this case a text encoded banner indicating an FTP response code. In some embodiments, the protocol inference system 150 may be configured to monitor network traffic for such banner data, for example, by implementing monitoring agents on one or more networking devices in the network 120.

The initial interaction between the client 110 and the server 130 may be carried out in a variety of ways. In some embodiments, the client may send an initial request to cause the server to generate the banner data 140. For example, the banner data 140 may be provided when the client first establishes a connection to a Transmission Control Protocol (TCP) port on the server. In other embodiments, the server 130 may be the one that initiates the first communication to the client 110 to provide the banner data 140. As another example, a UDP port or port employing some other type of connection-less protocol may also produce banner data. In some embodiments, such as with the HyperText Transfer Protocol (HTTP), the client may need to send an additional request after the connection to the server to cause the server to generate the banner data 140.

As shown in this example, the banner data 140 is a plaintext message from the server 130. In other embodiments, the banner data 140 may be binary encoded data that is not encoded to represent text characters. The banner data of different servers do not generally conform to any particular standard or formatting, even for servers that support the same protocol or use the same server software. Depending on the server and server software, the banner data may include content such as a welcome or warning message, a response code (here code 220), the server IP address (here 88.200.155.166), the hostname of the server, the name and/or version of the server software used (here "LiteFTPD 1.3.5d Server"), the date and/or time that the banner was generated, and certain server status information, among other types of information.

As shown, when the banner data 140 is received by the protocol inference system 150, the system will analyze the banner using a machine learned model 160 to infer a protocol 162 of the server. As shown, the protocol inference system 150 in this example implements a parser 152, which parses the banner data to extract a set of features 154 from the banner data. The extracted features may be encoded into a feature vector for input into the ML model 160. In some embodiments, the parser 152 (or a portion of the parser) may be implemented as part of the ML model 160 itself, so that the feature set 154 is generated as intermediate features within the model.

In some embodiments, the parser 152 may parse the banner data 140 into individual characters or tokens. The tokens may be obtained by separating the banner data based on specified delimiter characters, such as whitespace characters. The parser 152 may then analyze the characters or tokens to determine whether a particular character or token is present or absent in the banner data, or obtain a count of different characters or tokens in the banner data. The determined counts or presence information are included as features in the banner feature set 154. In some embodiments, the feature set 154 may be encoded in a bag-of-characters or bag-of-tokens representation, which ignores the ordering of the characters or tokens. Individual counts in the bag-of-characters or bag-of-tokens representation may be normalized based on a total count of characters or tokens in the banner. In other embodiments, the features may be encoded as a feature embedding that takes into account the ordering of the characters or tokens.

In some embodiments, the parser 150 may be configured to extract features corresponding to individual "n-grams" of characters or tokens in the banner data. For example, the parser may determine the counts or the presence of different sequences of two characters (e.g., "aa", "ab", "ac"). In some embodiments, the parser may be configured to look for particular longer character sequences. For example, the parser may be configured to determine the counts or the presence of different names of protocols (e.g., "ftp", "smtp", "ssh") in the banner data, and include such information in the extracted banner features.

In some embodiments, the parser 150 may be configured to perform a preprocessing step to remove certain types of content within the banner data 140 or replace such content with special characters or tokens. The replacement characters or tokens may be treated the same as other characters or tokens during the feature extraction process. Banner content that have low probative value for protocol determination may be selected for removal or replacement. In some embodiments, such low value content may include network addresses, server hostnames, dates, times, and time zones, etc. The preprocessing step may be implemented using one or more human-specified rules, or as part of the ML model 160 itself, which can be specifically trained to recognize such low-value content.

Depending on the embodiment, the ML model 160 may be implemented using a variety of different types of models that can be used for machine learning, including tree-based models (e.g. random forest models), neural network (e.g. recurrent or convolutional neural networks), or other types of models. In some embodiments, the ML model 160 may include an ensemble of multiple models, possibly of different model types. The ML model 160 may be trained via a supervised training process. During this process, a training dataset is compiled from banner data collected from previous network scans or synthetically created. Individual banner records in the training dataset are labeled with the correct protocol for that banner. The training data is then fed to the ML model to generate protocol predictions. The model's predictions are compared against the truth labels for the training records, and the model's decision parameters are adjusted based on the accuracy of its prediction results. Over many iterations of the training process, the parameters of the model will be tuned to produce prediction results with a high degree of accuracy. In one implementation, a random forest model was trained in this manner to predict the correct protocol from a training dataset of banners, and the model was able to achieve precision, recall, and F1-score values greater than 95%.

As shown, in some embodiments, the output of the model will indicate the inferred protocol 162, which in the illustrated example is the FTP protocol. In some embodiments, the model's output may also include a confidence value that indicates a level of confidence of the inferred protocol. Such confidence values may be generated as intermediate values during the inference process. In some embodiments, the inferred protocol 162 may be selected from a set of possible protocols, and the inferred protocol may be the protocol that has the highest confidence value among the set of possible protocols. In some embodiments, the protocol inference system or the ML model may require the inferred protocol to have a confidence value above a specified confidence threshold. If not, the protocol inference system or model will output an indeterminate result.

Figure 2:
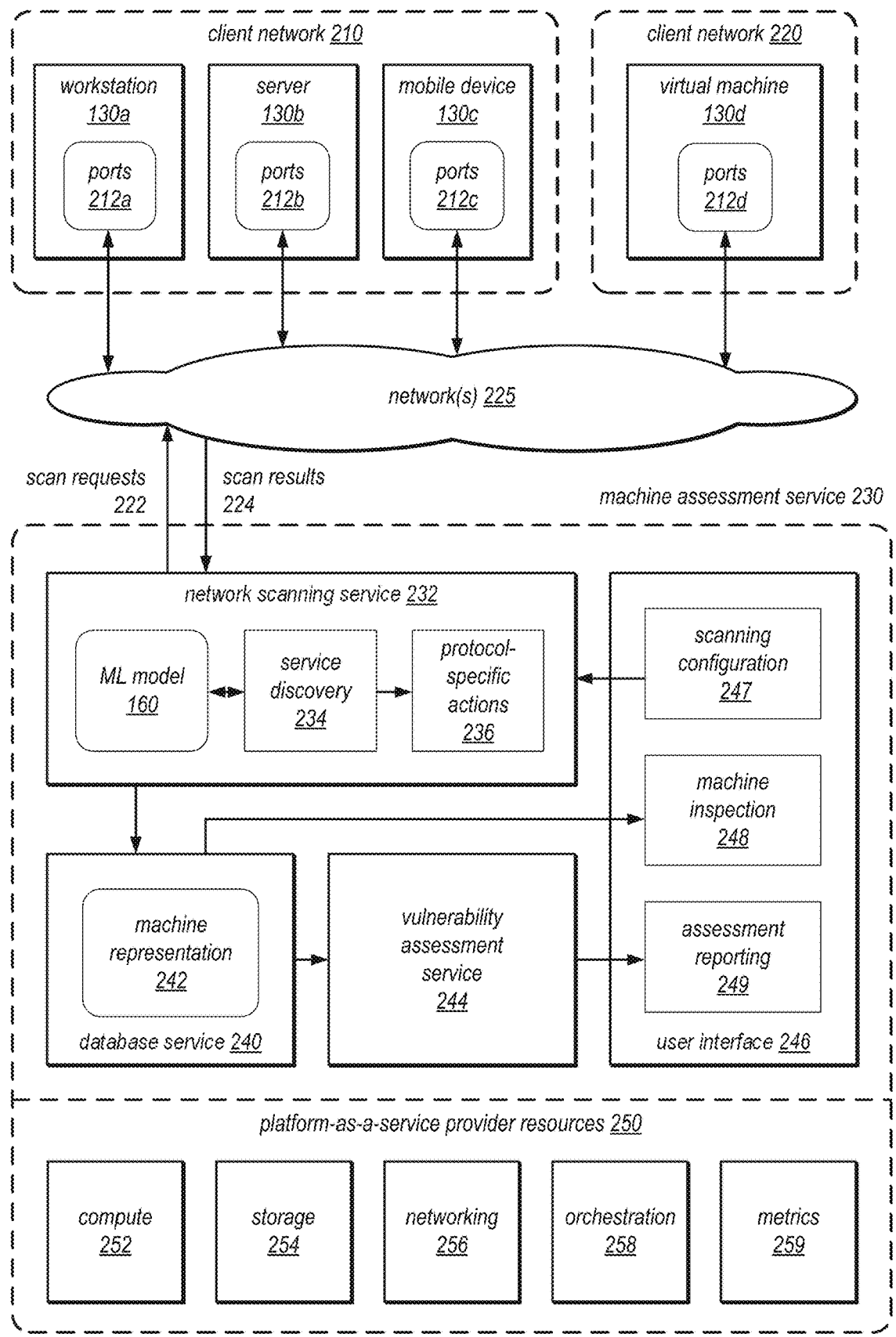
FIG. 2 is a block diagram illustrating a machine assessment service implemented by a platform-as-a-service provider network that employs a network scanning service that uses a ML model to infer service protocols from banner data, according to some embodiments.

FIG. 2 is a block diagram illustrating a machine assessment service implemented by a platform-as-a-service (PaaS) provider network that employs a network scanning service that uses a ML model to infer service protocols from banner data, according to some embodiments.

As shown in the figure, a network scanning service 232 is implemented within a machine assessment service 230. The network scanning service 232 is configured to perform scans of machines in remote client networks (e.g., client networks 210 and 220) over one or more networks 225. The client networks may be operated by different groups, organizations, companies, or other types of entities that are customers of the machine assessment service 230. In some embodiments, different clients may be associated with different user accounts of the machine assessment service 230.

In various embodiments, the network(s) 225 may encompass any suitable combination of networking hardware and protocols necessary to establish communications between the client networks 210 and 220 and the machine assessment service 230. In some embodiments, the machines 130 may execute in a private network of a company, behind a company firewall, and the network 225 may include a public network such as the Internet, which lies outside the firewall. The network 225 may encompass the different telecommunications networks and service providers that collectively implement the Internet. In some embodiments, the network 225 may also include private networks such as private local area networks (LANs), private wide area networks (WANs), or private wireless networks. The network 225 may be implemented using different hardware (e.g., modems, routers, switches, load balancers, proxy servers, etc.) and software (e.g., protocol stacks, accounting software, firewall/security software, etc.) for establishing networking links between the client networks 210 and 220 and the machine assessment service 230.

As shown, the client networks 210 and 220 include different types of computing resources, such as a workstation 130a, a server 130b, a mobile device 130c, and a virtual machine 130d. Each of these types of machines may be an embodiment of the server 130 of FIG. 1. The virtual machine 130d may be an instance of an emulated computer that is hosted on a physical virtual machine host. The virtual machine host may implement virtualization hardware and/or software (e.g. hypervisors) to execute and manage multiple instances of guest operating systems. Example implementations of such virtualization technologies include VMWARE ESX/ESXI, MICROSOFT HYPERV, AMAZON WEB SERVICES, and MICROSOFT AZURE. Another type of virtualized execution environment is the container, which provides a portable and isolated execution environment over a host operating system of a physical host. Example implementations of container technologies include DOCKER, GOOGLE KUBERNETES, AMAZON WEB SERVICES, and MICROSOFT AZURE. As may be appreciated, server machines 130 may include a variety of other types of computing systems, including embedded systems, networking devices, storage devices, Internet-of-Things (IoT) devices, vehicles, and the like.

As shown, each of these types of servers 130 may provide a number of ports 212a-d. For example, the ports may host software expecting UDP-based connections (e.g. DNS) or TCP-based connections (e.g. SSH). The network scanning service 232 may scan these ports to determine ports that are accessible to outside clients. Additionally, the network scanning service 232 may also be configured to determine the service protocols running on any detected open ports 212. The network scanning service 232 in this example may act as the client 110 of FIG. 1, and send scan requests 222 to the machines 130; the scan requests may include the initial requests 112 of FIG. 1. In response, the machines 113 may provide scan results 224 back to the network scanning service 232, which may include the initial responses 132 or banner data 140 of FIG. 1. As shown, the network scanning service in this example implements the ML model 160, which may be used to infer the service protocols of any open ports based on their banner data. In some embodiments, this functionality may be performed by a service discovery component 234. The service discovery component 234 may log service metadata about the open ports on the machines for machine assessment purposes.

As shown, the network scanning service 232 may also implement one or more protocol-specific actions 236. These actions may be directed to a particular port after a particular protocol is discovered on that port. For example, after a port is discovered to support the FTP protocol, the protocol-specification actions 236 may attempt to download a listing of the files on the FTP server via that port. As another example, the protocol-specific actions 236 may involve running a set of protocol-specific penetration tests on the port. As yet another example, the protocol-specific actions may include a further parsing or analyzing (e.g. using another ML model) of the banner data to extract additional information such as the type of platform of the machine 130 or the service software used by the machine 130. The additional information may also be logged as part of the metadata for that port.

As shown, the machine assessment service 230 may include a number of additional services, which are implemented on of the resources 250 provided by the PaaS provider. For example, a virtual representation 242 of the client machine may be hosted in a database service 240. In some embodiments, the machine assessment service 230 may construct a machine representation 242 for each machine 130 it scans, including any port metadata determined from the scans. The machine representation 242 may then be used for various assessments of the machine performed by the machine assessment service. The database service 240 may be implemented on top of storage resources 254 provided by the PaaS provider. For example, the PaaS provider may provide storage in the form of a database, a file system or a volume hosted in the cloud. In some embodiments, the storage provided by the machine assessment service 230 may be persistent storage. In some embodiments, the provided storage may not be guaranteed to be persistent, so that if the service is restarted, some of data may be lost. In some embodiments, the persistent storage provided by the machine assessment service 230 may be enhanced using a high-performance in-memory cache, which may be implemented on a managed cluster of compute nodes such as a REDIS cluster.

As shown, the machine assessment service 230 may implement a vulnerability assessment service 244. Vulnerability assessments of the machine may be conducted by an assessment orchestrator, which may invoke various jobs to assessment on the virtual representation 140 of the machine.

The assessments may identify various security vulnerabilities of the machine based on the collected machine characteristics. For example, an assessment may detect conditions such as the existence of malware signatures, missing application patches, suspicious network traffic patterns, among other things. In some embodiments, the vulnerability assessment service 244 may observe and track these conditions over time, to determine a problematic or suspicious pattern of changes on the machine. The vulnerability assessment service 244 may then generate an assessment report that details any detected security vulnerabilities about the machine, which may be provided the machine's owners via a user interface 246.

As shown, the machine assessment service 130 may also implement a user interface 246, which may be a web-based graphical or command line user interface. In this example, the user interface 246 provides a scanning configuration interface 247, a machine inspection interface 248, and an assessment reporting interface 249. The scanning configuration interface 247 may be used to configure various aspects of the network scanning service, including the scope of the scans, the types of protocol-specific actions to perform after the identification of a service protocol, and various configurable parameters (e.g. confidence thresholds) of the ML model, among other parameters. In some embodiments, the scanning configuration interface 247 may implement a user console to allow users to manually control a scan of remote machines and visualize scan results in real time. The machine inspection interface 248 may be used to examine the current state of the machine, as reflected by the virtual representation 140 of the machine. For example, the machine inspection interface 248 may allow users to navigate through the machine's port metadata, or issue queries against the configuration settings of the machine. The assessment reporting interface 249 may be used to provide results of machine assessments to users. In some embodiments, the assessment reporting interface 249 may include a notification interface that pushes notifications to registered users, for example, via email or text, or to a client-side repository.

As shown, the machine assessment service 230 may be implemented within a platform-as-a-service provider network. In some embodiments, the machine assessment service 230 may be configured as a web service that receives web services requests formatted as JSON documents. The machine assessment service 230 may support REST-style or document-based (e.g., SOAP-based) types of web services requests. In some embodiments, the machine assessment service 230 may implement service interfaces using other types of remote procedure calling protocols, such as GOOGLE PROTOCOL BUFFERS or PROTOBUF. The PaaS provider network may provide hardware and/or software to implement service endpoints, such that a request directed to that endpoint is properly received and processed.

As shown, the PaaS provider network may provide different types of computing resources 250, which can be leased by service customers to implement custom hosted services. As shown, the PaaS provider may provide resource services such as compute resource service 252, storage resource service 254, networking resources service 256, orchestration service 258, and resource metrics service 259. The services of the machine assessment service 130 may be built using these underlying resource services provided by the PaaS provider. In some embodiments, the PaaS resources 250 may implement features such as load balancing of incoming service requests and/or dynamic management and scaling of service node pools. In some embodiments, each of the services 232, 240, 244, and 246 may be implemented using a pool of service nodes provided by the PaaS provider, which may be individual instances of virtual machines. In some embodiments, the PaaS provider may be a provider such as AMAZON WEB SERVICES or MICROSOFT AZURE.

Figure 3:
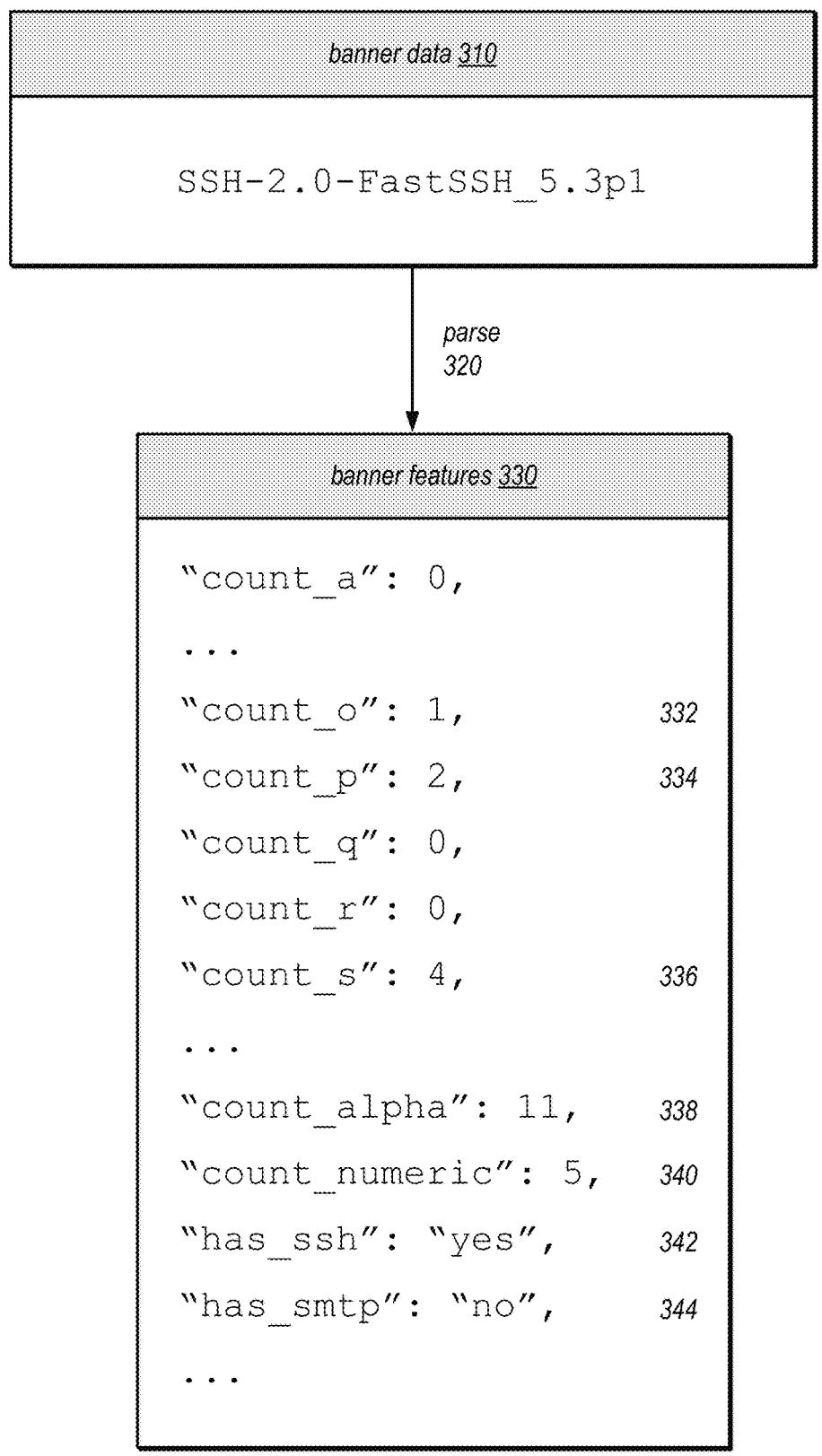
FIG. 3 illustrates an example set of banner features that are used by a ML model to infer a service protocol, according to some embodiments.

FIG. 3 illustrates an example set of banner features that are used by a ML model to infer a service protocol, according to some embodiments.

As shown, the figure depicts a banner 310 that is parsed 320 to extract a set of banner features 330. The parsing 320 may be performed by an embodiment of the parser 152 as discussed in connection with FIG. 1, and the banner features 330 may be provided as input to a ML model such as ML model 160 of FIG. 1 to infer a protocol from the banner data 310. Although the banner features 330 in this example are shown as key-value pairs with named attributes, in some embodiments, the features may be encoded as a feature vector when it is provided as input to the ML model.

As shown, the extracted banner features 330 in this example includes counts for individual characters in the banner 310. The banner features may include one count for each alphabetical character (A-Z and a-z) and numeric character (0-9). As shown, in this example, the counts indicate that there is one count 332 of the letter "o", two counts 334 of the letter "p", and four counts 336 of the letter "s". In some embodiments, these counts may be normalized in a manner to limit them to a range. For example, the counts may be normalized by a total number of characters in the banner 310, or binned to one of a number of specified ranges. In some embodiments, instead of counting individual characters, the parser may count "n-grams" of sequences of two, three, or four characters, etc. In some embodiments, instead of a count, a banner feature may indicate a binary value of whether a particular character or token exists in the banner.

As shown, the banner features 330 may also include counts of different types of characters. For example, feature 338 indicates that there are 11 alphabetical (A-Z and a-z) characters in the banner, and feature 340 indicates that there are five numeric (0-9) characters in the banner. In some embodiments, other types of character or token types may be counted, such as capitalized/lowercase characters, ASCII/non-ASCII characters, etc.

As shown, the banner features 330 may also include features that indicate whether particular sequences of characters, tokens, or substrings appear in the banner. For example, feature 342 indicates that the substring "ssh" appears in the banner, while feature 344 indicates that the substring "smtp" does not appear in the banner. In some embodiments, instead of an indicator indicating whether the substring is present, a feature may be included that indicates the number of times that the substring appears in the banner. As may be appreciated by those skilled in the art, a variety of different types of features may be used as input to the ML model to infer the protocol. For example, in some embodiments, the banner features may be represented as an embedding that encodes information about the ordering of the characters or tokens in the banner data 310.

Figure 4:
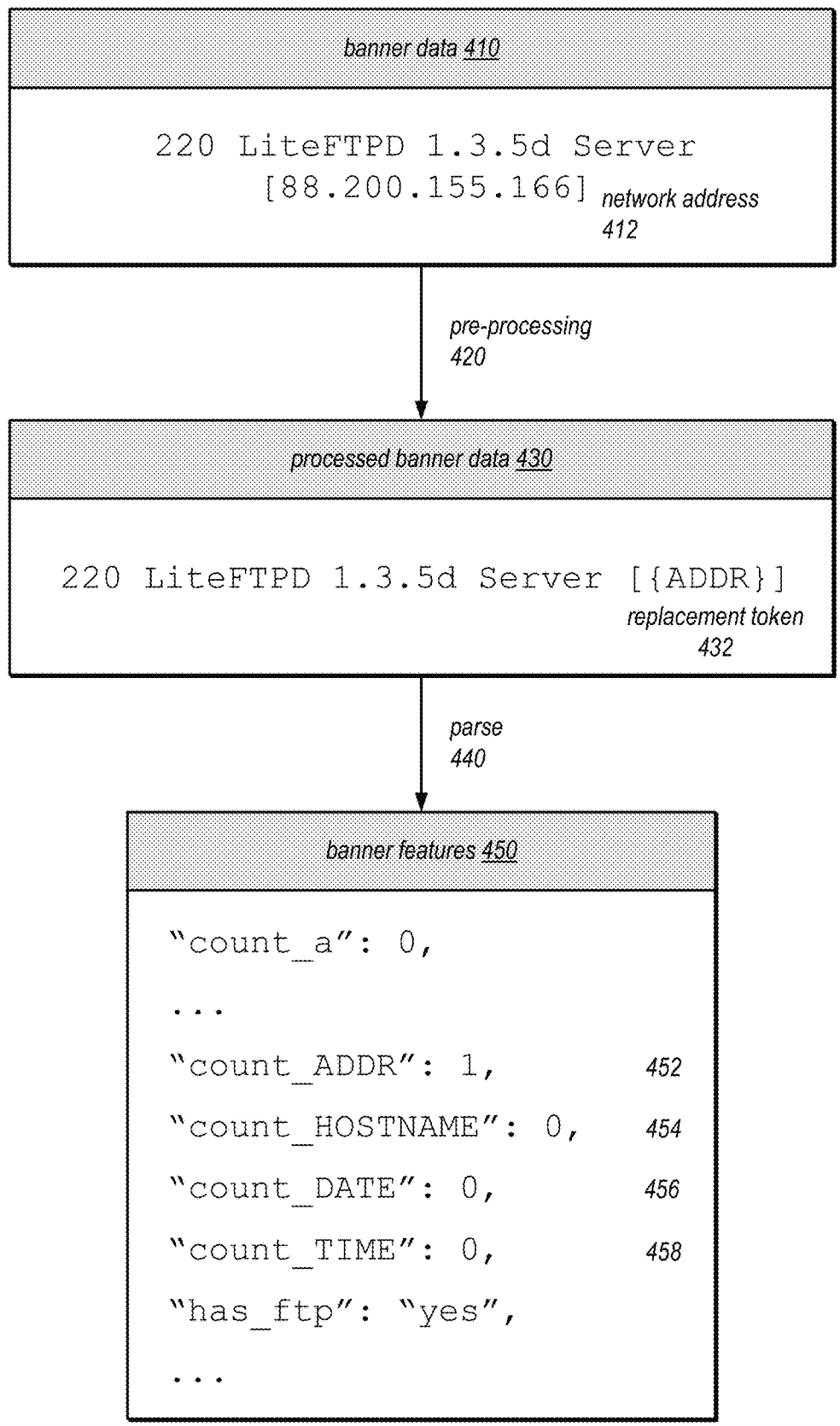
FIG. 4 illustrates a preprocessing step that replaces certain types of banner content with special tokens before feature extraction, according to some embodiments.

FIG. 4 illustrates a preprocessing step that replaces certain types of banner content with special tokens before feature extraction, according to some embodiments.

As shown, the figure depicts a banner 410 that is preprocessed 420 and then parsed 450 extract a set of banner features 450. The preprocessing 420 and parsing 440 may be performed by an embodiment of the parser 152 as discussed in connection with FIG. 1, and the banner features 450 may be provided as input to a ML model such as ML model 160 of FIG. 1 to infer a protocol from the banner data 410. Although the banner features 450 in this example are shown as key-value pairs with named attributes, in some embodiments, the features may be encoded as a feature vector when it is provided as input to the ML model.

As shown, in this example, the banner data 410 includes a network address 412. Depending on the server software, the generated banner data may include network addresses such as the IP address of the server. In some embodiments, banner content such as network addresses, hostnames, dates, and times, are not probative for the type of protocol, and when they are included in the banner features 450, they can skew the results of the ML model. Accordingly, in some embodiments, these types of contents are removed or replaced with a replacement token (e.g. token 432) during a preprocessing step 420. In some embodiments, the preprocessing step may be performed using specified rules (e.g. one or more search-and-replace rules) to remove or replace content that fit a particular textual pattern. In other embodiments, this preprocessing may be performed by the ML model itself, or a different ML model. As shown, in this example, the network address 412 is replaced with a special address character or token 432.

During the parse step 440, the special address token 432 is treated just like any other character or token in the banner data 410. In this example, it is counted just like another character in the banner data, and produces a feature 452 that indicates a count of the ADDR token. As shown, the banner features 450 also include features associated with other special tokens, such as a feature 454 for detected hostnames in the banner data, a feature 456 for detected dates, and a feature 458 for detected times. Depending on the embodiment, other types of special tokens may be used as placeholders for other types of banner content. The use of these tokens allows the presence of such banner content to be recognized by the ML model. However, such contents are removed from the banner data so they will not skew the lower-level features extracted from other portions of the banner data.

Figure 5:
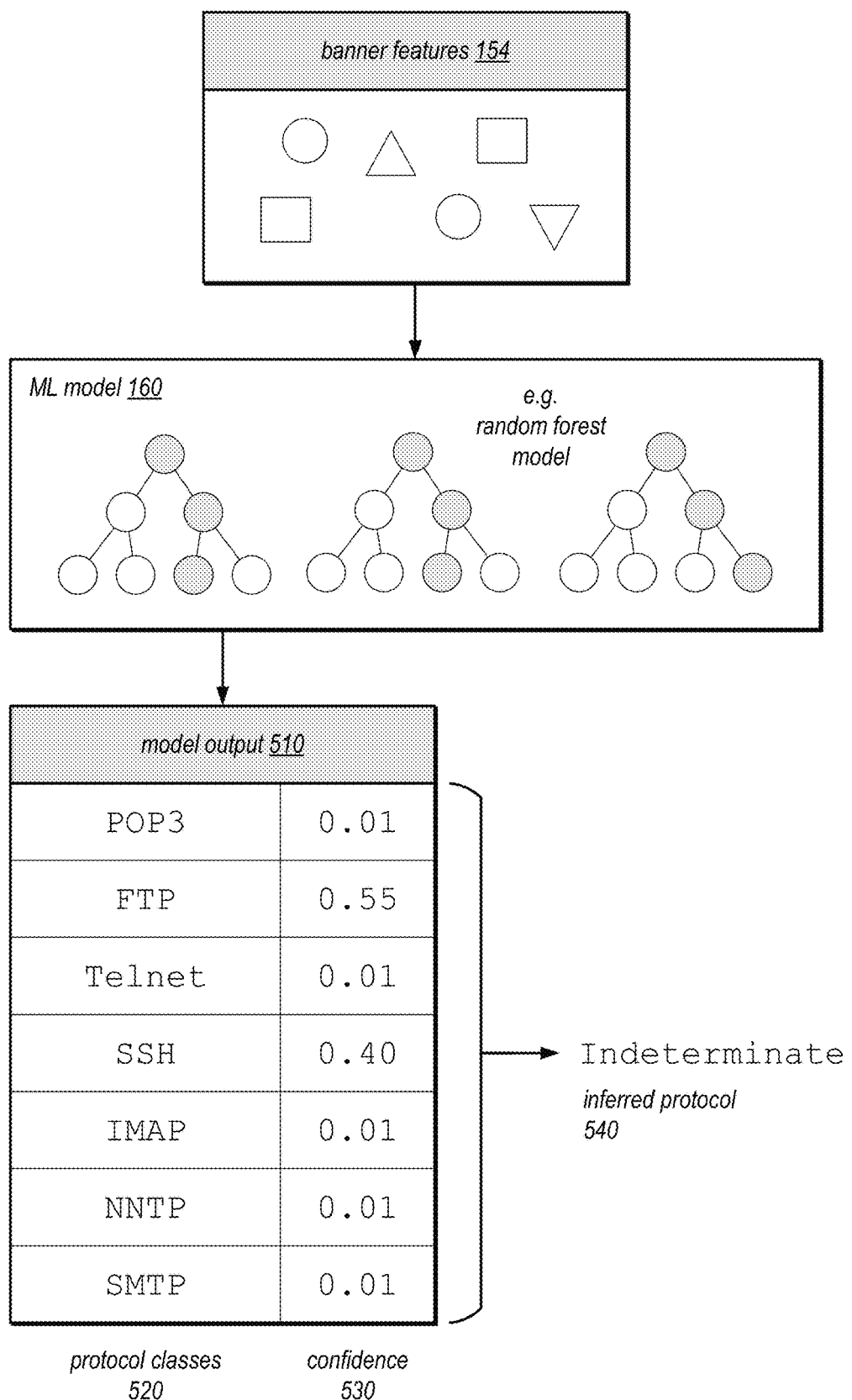
FIG. 5 illustrates an example output produced by a ML model trained to infer service protocols from banner data, according to some embodiments.

FIG. 5 illustrates an example output produced by a ML model trained to infer service protocols from banner data, according to some embodiments.

As shown in this figure, a set of banner features 154 is provided as input to an embodiment of the ML model 160, as discussed in connection with FIG. 1. In this example, the ML model 160 is a random forest model. The random forest model may be based on a set of decision tree that are generated using machine learning techniques. During training, each decision trees is built by determining questions to be asked at the tree nodes. The questions may be selected (or tuned) so that they cleanly divide the training samples into a set of desired classes. In a random forest model, a large number of decision trees are generated. In some embodiments, individual decision trees in the forest may be trained using a different random sampling of the training data. In some embodiments, individual decision trees may be trained using a different random subset of the features in the training data. The prediction results of the decision trees may then be combined in some manner, for example, by averaging the predictions of the entire forest or conducting a vote of the entire forest. In some embodiments, a random forest model reduces problems of overfitting that can occur with single-tree models.

As shown, the ML model 160 in this example produces a model output 510 that includes a set of all possible protocols 520, along with respective confidence indicators 530. In some embodiments, the confidence values may be generated from intermediate results that are produced by the random forest model. The confidence values may be expressed as probability values that sum to one. The confidence values may be analyzed by the model 160 or an external interpretive component to produce the ultimate inferred protocol. For example, the protocol class with the highest confidence value may be selected as the inferred protocol 540. In some embodiments, the model or protocol inference system may be configured so that the inferred protocol 540 must exceed a threshold confidence level (e.g. 90%). If no protocol class has a confidence value greater than the threshold, the model or protocol inference system will produce an indeterminate result as the output, as shown in this example.

FIG. 6 illustrates an example graphical user interface (GUI) that provides inference results of ML model trained to infer service protocols from banner data, according to some embodiments. In some embodiments, the GUI 600 shown in the figure may be provided as part of the user interface 246 for a machine assessment service 230, as discussed in connection with FIG. 2.

As shown, the GUI 600 provides results from a scan of a machine, which may be performed by a network scanning service 232 as discussed in connection with FIG. 2. The GUI provides a machine information section 610, which shows certain information about the machine that was scanned, such as the machines IP address, operating system, last scan time, next scan time, and a risk score. In some embodiments, the machine may be an asset or resource in a client network that is monitored by the machine assessment service. The machine assessment service may periodically scan (or passively monitor) the client network to discover new machines and open ports on the machines. In some embodiments, these scans may be performed periodically, based on a specified schedule. In some embodiments, the results from the scans may be used to determine security vulnerabilities of the machine, which may be quantified into a risk score.

As shown, the GUI 600 in this example provides a table 620 of detected open ports on the machine. In some embodiments, these open ports may be detected by sending scan requests 222 or connection requests to a range of ports on the machine. As shown, the table indicates a number of ports 622 that are open. The inferred protocol field 624 in the table indicate protocols that have been inferred from the open ports, using a protocol inference system such as system 150 of FIG. 1. As discussed, these inferences are made using a ML model, and based on the banner data returned from the ports. In some embodiments, the GUI may allow the inferences of the model to be manually inspected. For example, the GUI may allow users to click on the individual inferred protocols to examine the underlying banner data or change the protocol for that port.

As shown, the next field 626 of the table indicates whether the inferred protocol is located on a standard port. As discussed, many protocols are associated with a standard port number (e.g. the FTP protocol is generally associated with TCP port 21 by standard). When a detected protocol is seen on a non-standard port number, this observation may be explicitly noted in the scan results. For example, the table 620 shows that the HTTPS protocol was detected on port 122, which is different from the standard port number for that protocol (443). In some embodiments, detection of protocols on non-standard ports may cause an alert or notification to be generated (e.g. via email or text) to one or more users responsible for monitoring the client network.

As shown, the next field 628 in the table indicates whether the protocols of individual ports have changed since the last scan of the machine. In some embodiments, the port information for the machine, including their supported protocols, are stored as part of the metadata of the machine (e.g. as part of the machine representation 242 of FIG. 2). Changes in the port configuration or protocol may indicate events that are of interest to the machine assessment service. In some embodiments, such changes may cause an alert or notification to be generated to those monitoring the client network. In some embodiments, a newly detected protocol may cause additional machine data to be collected from the machine, or additional penetration tests to be performed on the machine.

As shown, the next field 630 in the table provides controls to allow users to manually launch certain protocol-specific tests on individual ports, given the detected protocol on those ports. For example, the protocol-specific tests for port 20 or 21 may attempt to perform a set of penetration tests that are specifically designed to target the FTP protocol. In some embodiments, the protocol-specific actions may involve further examination of the port's banner data to determine information such as the server platform and service software used for that port. In some embodiments, the protocol-specific tests may include obtaining a protocol fingerprint of the port by engaging in further communications with the port. The fingerprint may be used to validate the inference 624 generated by the ML model.

As shown, the next field 632 in this example indicates port test results for individual detected open ports. The test results may be updated in response to protocol-specific tests 630 that are run. In some embodiments, the test results may be used to determine the risk score of the machine shown in section 610. In some embodiments, the test results may also indicate remediation actions to reduce detected security vulnerabilities, for example, to apply patches to server software with known vulnerabilities.

Figure 7:
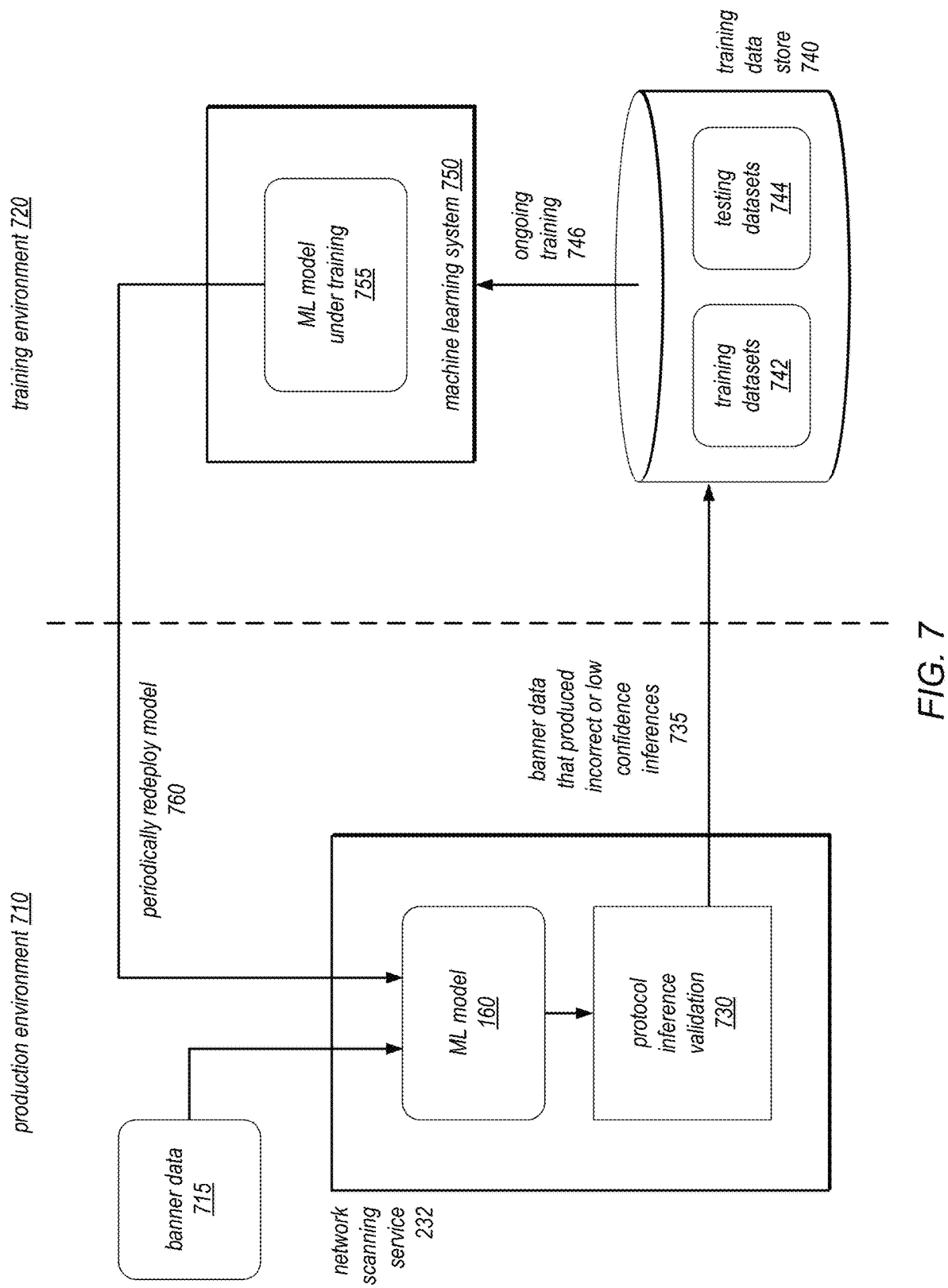
FIG. 7 illustrates an example system to perform ongoing training of a ML model to infer service protocols from banner data, according to some embodiments.

FIG. 7 illustrates an example system to perform ongoing training of a ML model to infer service protocols from banner data, according to some embodiments.

As shown, this figure depicts an embodiment of the network scanning service 232 in a production environment 710. The network scanning service 232 uses a trained version of the ML model 160 to analyze banner data 715 (e.g. obtained from active scanning of live networks) to infer protocols.

Additionally, in this example, the network scanning service 232 also includes a protocol inference validation component 730. The validation component 730 may be implemented as part of the network scanning service 232 itself, or in other embodiments, as a separate component from the service 232. The protocol inference validation component 730 may be configured to check, via another method, the protocol determinations of the model 160. For example, in some embodiments, the validation may involve manual validations based on user inspection of the banner data or user interactions with the subject port. In other embodiments, the validation may be performed programmatically by, for example, attempting communication with the subject port using the inferred protocol or generating a protocol fingerprint for the subject port. If the validation fails (e.g. if the validation component 730 identifies a different protocol or determines that the inferred protocol is incorrect), the banner data 735 that cause the model to produce the incorrect inference will be logged. As shown, in some embodiments, banner data 735 that produced low-confidence inferences may also be logged.

As shown, the incorrect or low-confidence banner data 735 seen in the production environment may be stored to a training data store or repository 740. In some embodiments, the training data store or repository may be located in a training environment 720 for training additional versions of the ML model (e.g. ML model 755). In some embodiments, problematic banner data 735 identified in the production environment may be used to compile or augment training data for the ongoing training 746 of later versions of the ML model. The banner data 735 identified from the production environment may be used to create training datasets 742, testing datasets 744, or both. As shown, these datasets may then be used by a machine learning system 750 in the training environment to train a later version of the ML model 755. In some embodiments, after the later version of the model is successfully trained, it may be redeployed 760 to the production environment 710 to replace the ML model 160. In this manner, the network scanning service 232 can continue to improve its protocol inference model over time based on additional observations of new banner data.

Figure 8:
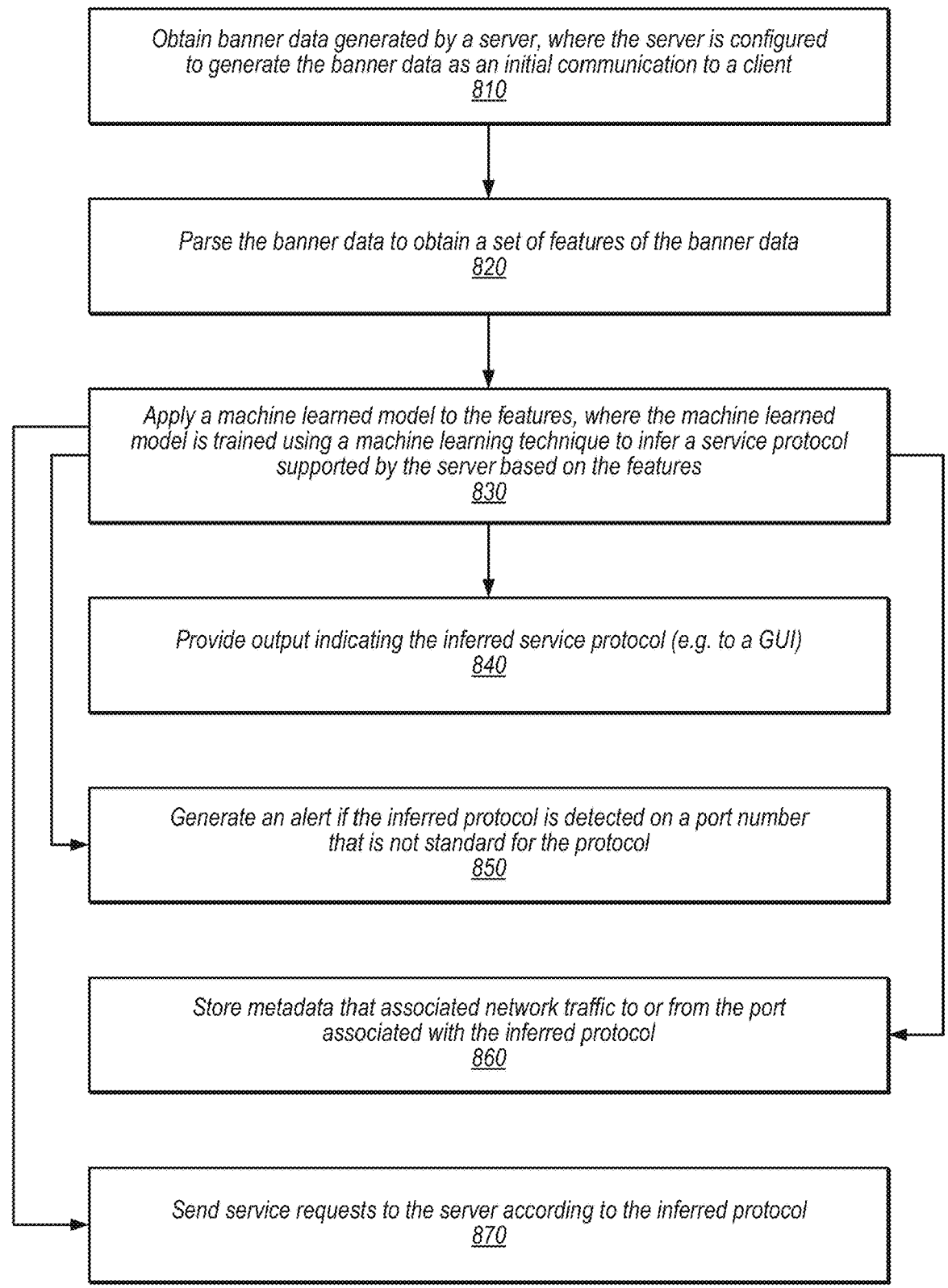
FIG. 8 is a flowchart illustrating a process of using a ML model to infer service protocols from banner data, according to some embodiments.

FIG. 8 is a flowchart illustrating a process of using a ML model to infer service protocols from banner data, according to some embodiments. Aspects of the depicted process may be performed by embodiments of the protocol inference system 150 of FIG. 1 or the network scanning service 232 of FIG. 2.

The process begins at operation 810, where a banner data (e.g. banner data 140) generated by a server (e.g. server 130) is obtained. In some embodiments, the server may be configured to generate such banner data (e.g. via a port on the server) as an initial communication to a client. For example, the server may be configured to generate the banner data in response to a connection request from the client or an established connection to the client. In some embodiments, the server may initiate the interaction with the client by sending the banner data to the client without any request from the client. Depending on the embodiment, the banner data may be formatted as text encoded data or binary encoded data. The banner data may include information such as a response code, the server's hostname or network address, the server's status, the service software and version used by the server, a service response code, a welcome or warning message, etc. In some embodiments, the protocol inference system may act as the client to the server or control the client, to cause the server to generate the banner. In other embodiments, the protocol inference system may be a passive observer of the server, and does not control the client or cause the banner data to be generated.

At operation 820, the obtained banner data is parsed to obtain a set of features of the banner data. The parsing may be performed by an embodiment of parser 152 of FIG. 1. The parsing of the banner data will generate a set of features of the banner data. The banner feature set may include features such as the counts or presence/absence of different characters or tokens in the banner, the counts or presence/absence of different strings or subsequence of characters or tokens, among other types of features. In some embodiments, the extracted feature set will be encoded as a feature vector suitable for input to the ML model.

At operation 830, the ML model (e.g. ML model 160 of FIG. 1) is applied to the banner features. As discussed, the ML model is trained using a machine learning technique to infer a service protocol supported by the server (e.g. a protocol running on a server port that generated the banner data), based on the banner features. The ML model may be implemented as different types of models, including tree-based models such as a random forest model, neural network models such as a recurrent or convolutional neural network, or other types of models. In some embodiments, multiple ML models or multiple types of ML models may be combined into a composite model, which may generate an output based on the respective outputs of its constituent models. In some embodiments, the ML model may be trained in an ongoing manner, so that it can be continuously improved with new observations of banner data, as discussed in connection with FIG. 7.

At operation 840, output of the ML model is provided. The output may be provided in a variety of ways, for example, via a GUI (or some other interactive interface) of the protocol inference system (e.g., as part of a scan report of the ports on a server). In some embodiments, the output may be provided via a programmatic interface such an API or a web service interface. In some embodiments, the determined protocol may be logged or stored in a database, for example, as part of the machine representation 242 of FIG. 2. In some embodiments, the output may indicate inferred protocol and also a confidence value for the inferred protocol, which may be determined during the execution of the model. In some embodiments, the output may include a list of possible protocols and their respective confidence values. In some embodiments, the protocol(s) indicated in the output may be required to be above a specified confidence threshold, which may be a configurable value.

As shown, a number of other actions may be automatically performed based on the output of the ML model. For example, at operation 850, an alert may be generated if the inferred protocol is detected on a port number that is not standard for that protocol. The alert may be generated as an indication on a GUI (e.g. as shown in FIG. 6), via a notification interface (e.g. via email or text), or via a programmatic interface (e.g. an API or web service call). In some embodiments, a similar alert or notification may be generated if a protocol change is detected on a server port. Depending on the context, these types of conditions may represent interesting events for security assessments of the server and tracked by a machine assessment system (e.g. the machine assessment service 230 of FIG. 2).

As another example, at operation 860, based on the inferred protocol, metadata will be stored to associate network traffic to or from a port that is associated with the inferred protocol. For example, in some embodiments, the protocol inference may be performed as part of a passive network traffic monitor (e.g. using a networking device or appliance in the same local network as the server). Once a port on the server is detected to be running a particular protocol, the network traffic monitor may be automatically configured to tag traffic data to or from that port with the detected protocol, before storing the traffic data or forwarding it to a remote network traffic analysis platform. In some embodiments, the metadata may also cause the network traffic monitor to monitor for other types of protocol-specific information about the port traffic, such as client IP addresses that accessed an HTTP port, or files that were uploaded or downloaded via an FTP port, etc.

As another example, at operation 870, the inference of the protocol may cause the protocol inference system to send protocol-specific requests to the server according to the inferred protocol. For example, in some embodiments, the protocol inference system may be configured to perform additional network penetration testing on a server port based on the determined protocol of a port, or collect additional data about the port based on the determined protocol. In some embodiments, such protocol-specific actions may be performed automatically based on logic implemented as part of a sophisticated network scanning process. In some embodiments, operations 840, 850, 860, and 870 may be used to perform a public scan of the Internet to compile and/or track metadata data about public ports accessible via the Internet.

Figure 9:
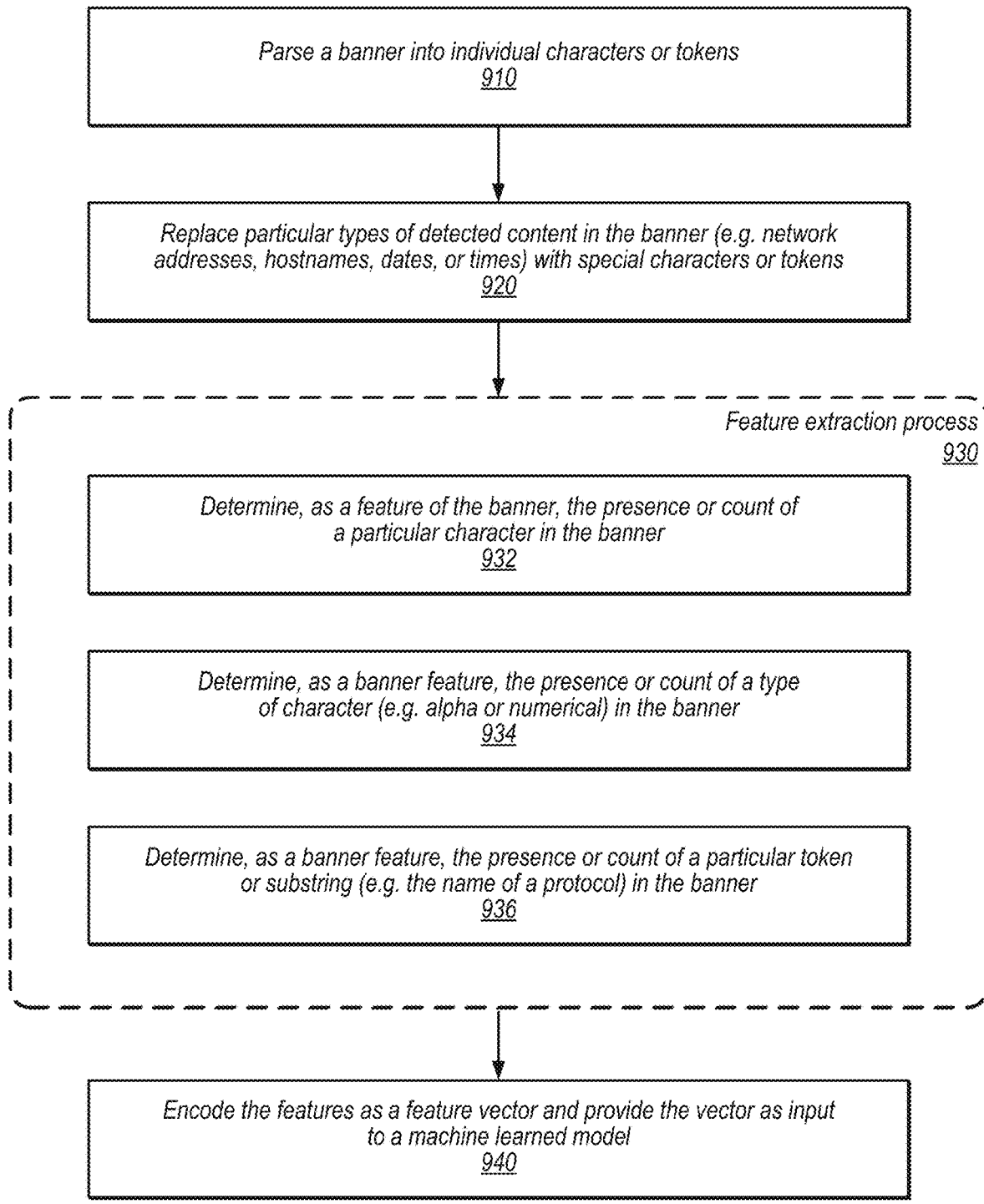
FIG. 9 is a flowchart illustrating a process of extracting banner features from a banner to infer a service protocol from the banner, according to some embodiments.

FIG. 9 is a flowchart illustrating a process of extracting banner features from a banner to infer a service protocol from the banner, according to some embodiments. The depicted process may be performed by embodiments of the parser 152 or ML model 160 of FIG. 1.

At operation 910, a banner is parted into individual characters or tokens. If the banner is parsed into multi-character tokens, the parsing may be performed based on a set of delimiter characters, such as whitespace characters.

At operation 920, a preprocessing step is performed where particular types of detected content in the banner are removed or replaced with special placeholder characters or tokens. As discussed in connection with FIG. 4, such removal or replacement may be performed on high-variance and/or low-value content in the banner that tend to skew results of the protocol inference. In some embodiments, such removed or replaced content may include detected network addresses, hostnames, dates, times, or time zones in the banner data. Operation 920 may be performed by a rule-based module external to the ML model, by the ML model itself, or by a different ML model.

As shown, operations 932, 934, and 936 are optional operations that may be performed during a feature extraction process 930. The feature extraction process will analyze the banner data and produce a number of a set of banner features (e.g. banner features 330 or 450) to represent the banner data for protocol inference. For example, operation 932 may determine the count or presence/absence of particular characters in the banner data as banner features. The characters may include special characters that were used to replace the high-variance or low-value content discussed for operation 920. As another example, operation 934 may determine the count or presence/absence of particular types of characters in the banner data. For example, banner features may include counts of alphabetic versus numerical characters, ASCII versus non-ASCII characters, and the like. As yet another example, operation 936 may determine the count or presence/absence of particular tokens or substrings in the banner. In some embodiments, the tokens or substrings may include things such as the name of a protocol (e.g. "smtp", "ftp", "ssh"). In some embodiments, particular response code may also be used to produce banner features. As may be understood by those skilled in the art, the banner features discussed here are mere examples, and other types of banner features may also be used for protocol inference in other embodiments.

At operation 940, after the banner features are extracted, they are encoded into a feature vector and provided as input to the ML model to infer the protocol. The feature vector may be encoded as a binary data that can be easily consumed by the ML model to generate the inferred protocol.

Figure 10:
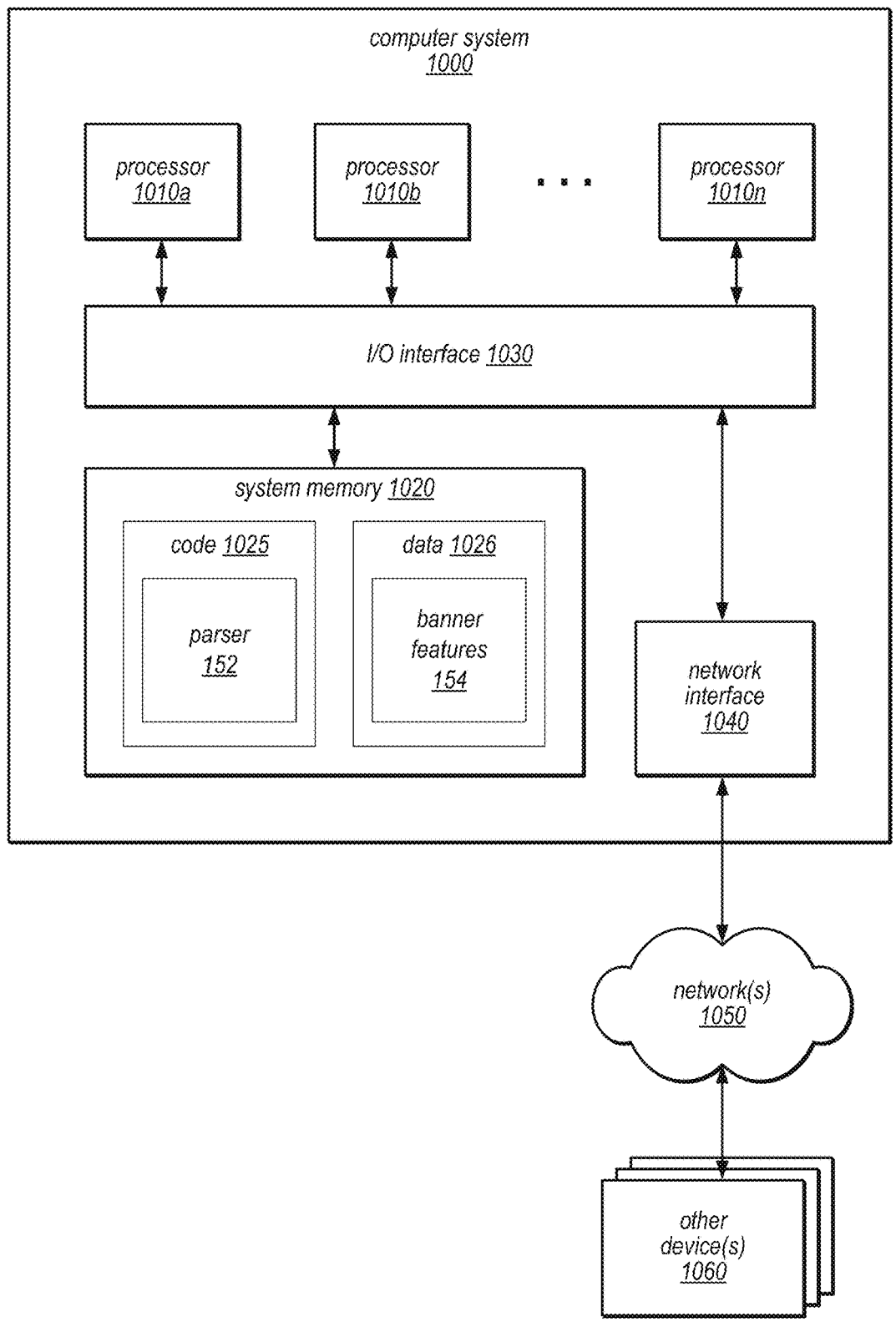
FIG. 10 is a block diagram illustrating an example computer system that can be used to implement one or more portions of a protocol inference system that uses a ML model to infer service protocols from banner data, according to some embodiments.

FIG. 10 is a block diagram illustrating an example computer system that can be used to implement one or more portions of a protocol inference system that uses a ML model to infer service protocols from banner data, according to some embodiments. For example, the computer system 1000 may be a server that implements one or more components of the protocol inference system 150 of FIG. 1 or the network scanning service 232 of FIG. 2.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 1000 includes one or more processors 1010, which may include multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010a-n, as shown. The processors 1010 may be any suitable processors capable of executing instructions. For example, in various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another server application executing on another computer system, as described herein.

As shown, computer system 1000 may use its network interface 1040 to communicate with one or more other devices 1060, such as persistent storage devices and/or one or more I/O devices. In some embodiments, some of these other devices may be implemented locally on the computer system 1000, accessible via the I/O interface 1030. In various embodiments, persistent storage devices may include disk drives, tape drives, solid state memory, other mass storage devices, or any other persistent storage device. The computer system 1000 may store instructions and/or data in persistent storage devices, and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1020 may be used to store code 1025 or executable instructions to implement the methods and techniques described herein. For example, the executable instructions may include instructions to implement the parse component 152, as discussed. The system memory 1020 may also be used to store data 1026 needed or produced by the executable instructions. For example, the in-memory data 1026 may include portions of the banner feature 154, as discussed.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1050. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:

1. A system, comprising:
one or more hardware processors with associated memory that implement a protocol inference system, configured to:
obtain banner data generated by a server, wherein the server is configured to provide one or more services to clients via one or more respective service protocols, and the banner data is generated as an initial communication to a client;
parse the banner data to obtain a set of features of the banner data;

apply a machine learned model to the set of features, wherein the machine learned model is trained using a machine learning technique to infer, based at least in part on the set of features, a service protocol supported by the server; and provide output of the machine learned model, wherein the output indicates the service protocol inferred.

2. The system of claim 1, wherein protocol inference system is implemented as part of a network scanning system configured to send an initial request to the server as the client, and the banner data is generated in response to the initial request.

3. The system of claim 2, wherein the network scanning system is configured to:

determine, based at least in part on the output of the machine learned model, that a port on the server that outputted the banner data is configured to support the service protocol; and cause the client to send, to the port, one or more subsequent service requests to the port according to the service protocol.

4. The system of claim 1, wherein the protocol inference system is implemented as part of a network scanning system configured to monitor network traffic to or from servers in a network, and the generation of the banner data is not caused by the network scanning system.

5. The system of claim 4, wherein the network scanning system is configured to:

determine, based at least in part on the output of the machine learned model, that a port on the server that outputted the banner data is configured to support the service protocol; and store metadata that associates observed network traffic to or from the port with the service protocol.

6. The system of claim 1, wherein the protocol inference system is configured to provide the output of the machine learned model is provided via a graphical user interface (GUI) to cause the GUI to indicate the service protocol as a machine-inferred protocol of the server.

7. The system of claim 1, wherein the protocol inference system is configured to:

determine that a port on the server that produced the banner data has a port number that is different from a standard port number associated with the service protocol; and generate an alert indicating that the service protocol is detected on a non-standard port number.

8. A method comprising:

performing, by one or more hardware processors with associated memory that implement a protocol inference system:

obtaining banner data generated by a server, wherein the server is configured to provide one or more services to clients via one or more respective service protocols, and the banner data is generated as an initial communication to a client;

parsing the banner data to obtain a set of features of the banner data;

applying a machine learned model to the set of features, wherein the machine learned model is trained using a machine learning technique to infer, based at least in part on the set of features, a service protocol supported by the server; and providing output of the machine learned model, wherein the output indicates the service protocol inferred.

9. The method of claim 8, wherein the inferring of the service protocol comprises selecting one of a plurality of different protocols, including two or more of:

Post Office Protocol version 3 (POP3),
File Transfer Protocol (FTP),
Telnet protocol,
Secure Shell protocol (SSH),
Internet Message Access Protocol (IMAP),
Network News Transfer Protocol (NNTP),
Simple Mail Transfer Protocol (SMTP),
Hypertext Transfer Protocol (HTTP), and
Hypertext Transfer Protocol Secure (HTTPS).

10. The method of claim 9, wherein the providing of the output of the machine learned model comprises providing an output vector indicating respectively probabilities of individual ones the plurality of different protocols.

11. The method of claim 8, further comprising performing, by the protocol inference system:

determining, using the machine learned model and for another set of features obtained from another banner data, that no service protocol can be inferred from the other banner data with a sufficient level of confidence; and providing an output of the machine learned model indicating an indeterminate result for the other banner data.

12. The method of claim 8, wherein:

the parsing of the banner data comprises parsing a text sequence into individual text characters; and the obtaining of the set of features comprises determining one or more of:

a count of a particular character in the text sequence,
an indication of presence or absence of a particular character in the text sequence,
a count of alphabetical characters in the text sequence, and
a count of numerical characters in the text sequence.

13. The method of claim 12, wherein the obtaining of the set of features comprises determining one or more subsequences of characters in text sequence that matches a name associated with a particular service protocol.

14. The method of claim 12, wherein:

the parsing of the banner data comprises determining and replacing one or more types of content in the banner data with one or more respective special characters or tokens, the one or more types of content indicating one or more of:

a network address,
a hostname,
a date or time, and
a time zone; and the obtaining of the set of features comprises determining a count or an indication of presence or absence of individual ones of the one or more special characters or tokens in the banner data.

15. One or more non-transitory computer-accessible storage media storing program instructions that when executed on or across one or more processors implement at least a portion of a network scanning system, wherein the program instructions when executed on or across the one or more processors cause the network scanning system to:

obtain banner data generated by a server, wherein the server is configured to provide one or more services to clients via one or more respective service protocols, and the banner data is generated as an initial communication to a client;

parse the banner data to obtain a set of features of the banner data;

apply a machine learned model to the set of features, wherein the machine learned model is trained using a machine learning technique to infer, based at least in part on the set of features, a service protocol supported by the server; and provide output of the machine learned model, wherein the output indicates the service protocol inferred.

16. The one or more non-transitory computer-accessible storage media of claim 15, wherein the program instructions when executed on or across the one or more processors cause the network scanning system to:

send a connection request to a Transmission Control Protocol (TCP) port on the server; and determine, based at least in part on the output of the machine learned model, that the UDP port is configured to support the inferred service protocol.

17. The one or more non-transitory computer-accessible storage media of claim 15, wherein the program instructions when executed on or across the one or more processors cause the network scanning system to:

send a packet to a User Datagram Protocol (UDP) port on the server; and determine, based at least in part on the output of the machine learned model, that the UDP port is configured to support the inferred service protocol.

18. The one or more non-transitory computer-accessible storage media of claim 15, wherein the program instructions when executed on or across the one or more processors cause the network scanning system to implement a random forest model as the machine learned model.

19. The one or more non-transitory computer-accessible storage media of claim 15, wherein the program instructions when executed on or across the one or more processors cause the network scanning system to:

determine that a particular service protocol inferred from a particular banner data is incorrect; and store the particular banner data in a banner repository, wherein banner data in the banner repository are used to compile training datasets for further training of the machine learned model.

20. The one or more non-transitory computer-accessible storage media of claim 19, wherein to parse the banner data to obtain the set of features, the program instructions when executed on or across the one or more processors cause the network scanning system to:

replace one or more types of content in the banner data with one or more respective special tokens, the one or more types of content indicating one or more of:

a network address, a hostname, a date or time, and a time zone; and determine, as one or more features, a count or a presence or absence of individual ones of the one or more special tokens in the banner data.

* * * * *